(12) United States Patent
Labeau et al.

(10) Patent No.: US 12,071,495 B2
(45) Date of Patent: Aug. 27, 2024

(54) POLYMERS FOR METAL SURFACE TREATMENT

(71) Applicant: SPECIALTY OPERATIONS FRANCE, Lyons (FR)

(72) Inventors: Marie-Pierre Labeau, Sevres (FR); Guillaume Gody, Rueil-Malmaison (FR)

(73) Assignee: SPECIALTY OPERATIONS FRANCE, Lyons (FR)

( * ) Notice: Subject to any disclaimer, the term of this patent is extended or adjusted under 35 U.S.C. 154(b) by 609 days.

(21) Appl. No.: 17/293,543

(22) PCT Filed: Nov. 27, 2019

(86) PCT No.: PCT/EP2019/082792
§ 371 (c)(1),
(2) Date: May 13, 2021

(87) PCT Pub. No.: WO2020/109413
PCT Pub. Date: Jun. 4, 2020

(65) Prior Publication Data
US 2022/0002456 A1   Jan. 6, 2022

(30) Foreign Application Priority Data
Nov. 27, 2018  (EP) ..................... 18208625

(51) Int. Cl.
*C08K 5/13* (2006.01)
*C08F 220/06* (2006.01)
*C23C 22/34* (2006.01)
*C23C 22/73* (2006.01)
*C23C 22/78* (2006.01)
*C23C 22/82* (2006.01)

(52) U.S. Cl.
CPC .............. *C08F 220/06* (2013.01); *C08K 5/13* (2013.01); *C23C 22/34* (2013.01); *C23C 22/73* (2013.01); *C23C 22/78* (2013.01); *C23C 22/82* (2013.01)

(58) Field of Classification Search
CPC ............................ C08F 220/06; C08F 212/24
USPC ....................................... 525/329.7
See application file for complete search history.

(56) References Cited

U.S. PATENT DOCUMENTS

| | | |
|---|---|---|
| 4,191,596 A | 3/1980 | Dollman et al. |
| 4,761,189 A | 8/1988 | Mady et al. |
| 5,534,082 A | 7/1996 | Dollman |
| 2013/0209812 A1 | 8/2013 | Gorodisher et al. |

FOREIGN PATENT DOCUMENTS

WO  9713588  4/1997

*Primary Examiner* — Terressa Boykin
(74) *Attorney, Agent, or Firm* — Osha Bergman Watanabe & Burton LLP

(57) ABSTRACT

Provided are polymers obtained by radical copolymerization of a mixture of (1) acrylic acid; (2) methacrylic acid; and (3) at least one allylcatechol selected from 4-allylbenzene-1,2-diol, 3-allylbenzene-1,2-diol and mixtures thereof. The polymers are especially useful for treating a metallic surface intended to be coated by a paint, a varnish or an adhesive. Also provided are methods of coatings making use of this polymer P, compositions comprising the polymer P and useful for these methods, and the obtained coated materials.

19 Claims, No Drawings

POLYMERS FOR METAL SURFACE TREATMENT

This application is a U.S. national phase entry under 35 U.S.C. §371 of International Application No. PCT/EP2019/082792, filed on Nov. 27, 2019, which claims priority to European Application No. 18208625.6, filed on Nov. 27, 2018. The entire contents of these applications are explicitly incorporated herein by this reference.

The instant invention relates to the field of the treatment of surfaces based on metal, and especially metal surfaces intended to be coated with film-forming organic compositions such as paints, varnishes or adhesive compositions. The invention is more especially directed to a treatment of said metal surfaces aiming at providing a protection especially against corrosion and/or an enhancement of the adherence of the film-forming organic.

In order to provide such effects on metal surfaces, especially on aluminum or steel, several methods have been proposed, including i.a. the deposit of inorganic coatings on the surface of the metal, especially the so-called "conversion coating".

The term "conversion coating" is well known in the art and refers to a layer formed on the surface of a metal, that is an advantageous replacement of native oxide on said surface (especially on aluminum), and which is obtained by the controlled chemical formation of a film on the metallic surface by reaction with chemical elements of the metallic surface, so that at least some of the cations dissolved from the metallic material are deposited in the conversion coating.

Typically, coating such as conversion coatings are obtained by reacting the metal surface with solutions containing metal cation and fluorides. In the past, chromium-containing coatings have been proposed (typically obtained by reaction of the surface with a solution including $H_2CrF_6$), and, more recently, less toxic coatings based e.g. on zirconium, titanium or other metals (for example obtained by reaction of the surface with a solution including $H_2TiF_6$, $H_2ZrF_6$, $H_2HfF_6$, $H_2AlF_6$, $H_2SiF_6$, $H_2GeF_6$, $H_2SNF_4$, or $HBF_4$). A conversion coating may include other compounds such as silane precursors for example.

For enhancing the corrosion resistance and paint adhesion on a coating such as conversion coatings it is known to add some additives, especially organic polymers. In this connection, it has been for example described the use of polyacrylic acids. A typical additive is ACUMER™ 1510 available from DOW (and previously form Rohm & Haas) that has been widely described for this kind of application. For more details in this connection, it may be especially be refered to WO97/13588, U.S. Pat. Nos. 4,191,596, or 4,921,552.

One aim of the present invention is to provide a new method for treating a metal surface, that imparts a good protection of the metal surface against corrosion and a good adherence of film-forming organic compositions such as paints, varnishes or adhesive compositions applied to the metal surface.

To this end, the instant invention proposes to make use of a specific polymer, preferably together with (namely before, during, or after) the formation of a conversion coating, which advantageously leads to treated metal surface that reveals very interesting: when coated by a film-forming compositions such as a paint, varnish or adhesive composition, a good adherence is obtained between the surface and the coated composition. Besides, a good protection of the surface is obtained, especially against corrosion.

More precisely, the instant invention make use of at least one Polymer P, which is a polymer obtained by radical copolymerization of a mixture of:
- acrylic acid (AA);
- methacrylic acid (MAA); and
- at least one allylcatechol which is selected from 4-allyl-benzene-1,2-diol; 3-allylbezene-1,2-diol and mixtures thereof.

The compounds 4-allylbenzene-1,2-diol and 3-allyl-bezene-1,2-diol respectively have the following formulae:

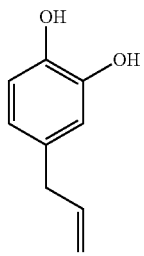

4-allylbenzene-1,2-diol

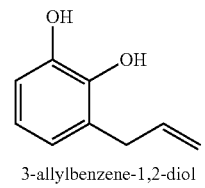

3-allylbenzene-1,2-diol

The polymer P typically contains a mixture of the two isomers as the allylcatechol, having typically a molar ratio 4-allylbenzene-1,2-diol to 3-allylbezene-1,2-diol between 30/70 and 70/30, for example between 50/50 and 70/30.

The polymer P preferably contains acrylic acid (AA) at a content of 10 to 90% in mol; methacrylic acid (MAA) at a content of 1 to 70% in mol, and allylcatechol at a content of 1 to 20% in mol, each of the molar ratio being calculated on the basis of the total quantity of AA, MAA and allylcatechol.

The molecular weight of polymer P is typically between 10 and 150 kDa., e.g. between 15 and 100 kDa.

According to a specific embodiment, the polymer P contains allylcatechol at a content of 1 to 5% mol. In that case, the polymer P generally contains MAA at a content of at most 70% mol and has a molecular weight $M_w$ of 80 kDa or less.

According to another specific embodiment, the polymer P contains allylcatechol at a content of 5 to10% mol. mol. In that case, the polymer P generally contains MAA at a content of at most 40% mol and has a molecular weight $M_w$ of 40 kDa or less.

According to another specific embodiment, the polymer P contains allylcatechol at a content of 10 to 15% mol. In that case, the polymer P generally contains MAA at a content of at most 20% mol and has a molecular weight $M_w$ of 30 kDa or less.

According to another specific embodiment, the polymer P contains allylcatechol at a content of 15 to 20% mol. In that case, the polymer P generally contains MAA at a content of at most 10% mol and has a molecular weight $M_w$ of 20 kDa or less.

According to a first aspect, the polymers P as described above, that have not been described in the prior art at the inventors best knowledge, constitute a subject-matter of the invention.

In the scope of the invention, the inventors have now observed than the use of Polymer P leads to a protection and a promotion of adherence between the metal surface and a paint coated on the surface that are better than those observed with usual additives such as ACUMER™ 1510.

According to a specific aspect, one specific object of the instant invention is the use of at least one polymer P as defined above for treating a metallic surface intended to be coated by a paint, a varnish or an adhesive. The metal surface to be treated is preferably a surface comprising a metal selected from aluminum, steel, zinc, magnesium and their alloys. The invention is especially interesting for metal surface of aluminum or aluminum alloy.

According to an interesting embodiment, a conversion coating is applied on the metallic surface to be treated, by reaction of said surface with a conversion composition (in other words, a conversion composition a is applied on the metallic surface for forming a conversion coating thereon). In that case, typically:

- the conversion composition include all or part of the polymer P as an additive; and/or
- the conversion coating is applied on the metallic surface and then all or part of the polymer P is applied on the conversion coating.

According to another possible embodiment, compatible with the previous one, all or part of the polymer P is present in a paint, a varnish or a coating applied on the surface, preferably after application of a conversion coating on the metal surface.

According to another aspect, one other specific object of the invention is a process for coating a metallic surface with a paint, a varnish or an adhesive, preferably with a paint, including a step of treating said surface with at least one composition including at least one polymer P as defined above. In that scope, the composition comprising the polymer P may typically be:

- a conversion composition including a polymer P; and/or
- a solution or a dispersion of the polymer P, preferably applied on the surface after having applied a conversion coating on the surface to be treated ; and/or
- the paint, varnish or adhesive, that may comprise all or part of the polymer P.

The conversion composition including a polymer P and the paint, varnish or adhesive compositions containing the same also constitute specific object of the instant invention Typically, the polymer P is present in the conversion composition and/or in a solution or dispersion applied on a conversion coating. In that case, the paint, varnish or adhesive is applied on a surface previously treated by the polymer. According to some specific embodiments, an additional layer may applied between the treated surface and the paint, varnish or adhesive is applied (this is for example the case for the treatment of metal foil on a first site, that have then to be coated, for example painted, on a second site: in that case, a lubricant may be applied on the treated foil, in order to allow to roll the foil and ease its transportation).

According to yet another aspect, a specific object of the instant invention are the materials comprising a metal surface comprising a metal surface which is in all or part (i) treated with a polymer P as defined above and (ii) covered by a paint, a varnish or an adhesive.

These materials include i.a. materials that have a metal surface in all or part covered by:

- at least one coating (typically a conversion coating and/or a paint, a varnish or an adhesive layer) comprising at least one polymer P; and/or
- a layer (typically a conversion coating) comprising a reaction product of the polymer P as defined above with a metal of the treated surface or another compound present in said layer.

Specific features and possible embodiments will now be described in more details.

The Treated Metal Surface

Any metal surface may be treated with polymer P of the invention, but the invention is especially suitable for treating metal surfaces of:

- aluminum or an aluminum-based alloy; or
- steel, for example galvanized steel (hot dip galvanized HDG or electrogalvanized EG); or cold rolled steel (CRS); or
- magnesium or magnesium-based alloys; or
- Zinc or zinc-based alloys The invention is especially interesting for metal surface of aluminum and aluminum alloys, such as Aluminum Alloy AA 5005 tested in the appended examples, or other alloys such as those of Series 1xxx, 2xxx, 3xxx, 4xxx, 5xxxx, 6xxx, such as AA1050, 2024, 3003, 5182, 5754, 6111, 6016, 6060, 6063, 6182.

The Conversion Coating

When a conversion coating is applied on the metal surface to be treated according to the invention, it may be obtained by contacting the surface with any conversion composition known from the prior art.

Contacting the metal surface with the conversion composition may be made by any means known per se, such as dip coating in a conversion bath or spray coating, as illustrative examples.

The conversion composition used according to the invention may typically contain fluorides anions and cationic metals, e.g. compounds such as $H_2CrF_6$, or more preferably chromium free compounds such as $H_2TiF_6$, $H_2ZrF_6$, $H_2HfF_6$, $H_2AlF_6$, $H_2SiF_6$, $H_2GeF_6$, $H_2SNF_4$, or $HBF_4$.

The conversion composition may also include other compounds, such as silane precursors for example, and/or cerium salts, and/or terbium molybdate.

In addition, according to a specific embodiment, the conversion composition may contain all or part of the polymer P used according to the invention for treating the surface.

In that case, the application of the conversion layer lads per se to a surface treatment according to the invention.

Otherwise, the treatment is typically obtained after the formation of the conversion layer, by contacting the metal surface carrying the conversion layer with the polymers P (they may typically be applied on the conversion layer in the form of a solution or a suspension of polymers P, or within a paint, a varnish or an adhesive composition applied on the conversion layer).

According to a specific embodiment, it may be contemplated to make use of the polymer P both in the conversion composition and within a paint, a paint, a varnish or an adhesive composition applied on the conversion layer.

The following examples illustrate the invention.

EXAMPLE

Example 1

Synthesis of a Polymer P1 According to the Invention

Poly(AA-stat-MAA-stat-allylcatechol) 26/70/4 mol %

A polymer P1 was prepared as follows:
4-allylpyrocatechol (5.50 g, 36.6 mmol) having a molar ratio 4-allylbenzene-1,2-diol and 3-allylbenzene-1,2-diol of 60/40, acrylic acid (AA) at 58.4% in water (1.47 g, 11.9 mmol) and 2,2'-Azobis(2-methylpropionamidine)dihydrochloride (V-50) at 5% in water (74.49 g, 13.7 mmol) were added in a 500 mL three-neck round-bottom flask. After stirring for 20 minutes under nitrogen, the round-bottom flask was placed into a 66° C. oil bath. After 10 minutes, two aqueous solutions of AA at 58.4% (13.96 g, 113.1 mmol) and methacrylic acid (MAA) at 58.4% (37.79 g, 256.4 mmol) were added dropwise over 2 hours. After completion, two aqueous solutions of AA at 58.4% (13.96 g, 113.1 mmol) and MAA at 58.4% (56.68 g, 384.5 mmol) were again added dropwise over 4 hours and 6 hours respectively. After a final 2 hours cooking, the round-bottom flask was removed from the oil bath and the reaction mixture was analysed by $^1$H NMR spectroscopy (AA conversion=99%; MAA conversion=97%; 4-allylpyrocatechol conversion =91%) and by size exclusion chromatography ($M_w$=57 kg/mol; $M_n$=21 kg/mol; D=2.1).

A Brucker 300 MHz spectrometer was used to record proton nuclear magnetic resonance ($^1$H NMR) spectra. To measure AA, MAA and 4-allylpyrocatechol conversions, four drops of the reaction mixture was diluted in around 1 g of deuterated water ($D_2O$).

Molar masses were measured by Size Exclusion Chromatography (SEC) equipped with a MultiAngle Laser Light Scattering (MALLS) Mini Dawn TREOS detector and an Agilent concentration detector (RI detector). The SEC system is running on three columns Agilent Aquagel OH mixed H, 8 μm, 3*30 cm at a flow rate of 1 mL/min and with the following mobile phase: $H_2O$ 100% vol. 0.1 M NaCl, 25 mM $NaH_2PO_4$, 25 mM $Na_2HPO_4$ buffer solution pH 7. Polymer samples have been dissolved at 0.5 wt % in the mobile phase for at least 4 hours then filtrated in a Millipore filter 0.45 μm. Absolute molar masses were obtained with the dn/dC of the poly(acrylic acid) equal to 0.1875 mL/g.

Example 2

Use of the Polymer of Example 1

Tests have been performed on aluminum alloy panels (AA5005, from Q-Panel), with usual lab equipment (beakers, oven, . . . ), a powder coating installation (GEMA 2C from Industrie Systemes) and a corrosion chamber (Q-FOG CRH 600L, from QFOG).

In each test, the following protocol has been applied:
Cleaning and etching
  It was made by dipping each pannel to be tested in a combined cleaning-etching bath, which was a 1 L bath is typically made by diluting a commercially available formulation, DBT ALU 200, available from Chemtec Aertec (5 g of DBT ALU 200 into 995 g of water). The pannel was dipped in the cleaning-etching bath for 3min under light stirring (200rpm) at 50° C. The pannel was then rinsed with 1 L of de-ionized water.
Treatment
  It was performed by dipping the panel obtained after the cleaning/etching of the previous step in a treatment bath, which was a 1 L bath made by diluting in water:
    zirconium hexafluoride $H_2ZrF_6$ at a concentration of 200 ppm active (0.02wt %); and
    the additive to be tested (Polymer P1 of example 1 according to the invention, vs ACUMER™ 1510 in the comparative examples), at concentrations from 50 ppm active (0.005wt %) up to 1,000 ppm (0.1wt %)given in the tables below:
  The panel was immerged for 2min in the treatment bath at 25° C. It was not rinsed.
  The excess of bath solution was flushed away from the surface with compressed air.
  The panel was then dried for 30min in an oven at 60° C.
Painting:
  Each panel was then painted with a polyester white powder paint from RIPOL (BIANCO RAL 9010).
Tests
  Each Panel was then tested according to protocols similar to those described in the following standards listed below:
    Acetic acid salt spray: T=35 (+/−2)° C., [NaCl]=50 (+/−5)g/L, pH=3.1-3.3 (ISO 9227)
    Scribing protocol: as described in ISO 17872
    Degree of rusting quoted as described in ISO 4628-3
    Degree of blistering quoted as described in ISO 4628-2
Rusting Results
  assessed according to ISO 4628-3

| | Polymer | | | | | | | |
|---|---|---|---|---|---|---|---|---|
| | ACUMER ™ 1510 Comparative | | | | P1 | | | |
| Exposure time | 308 h | 564 h | 758 h | 1000 h | 308 h | 564 h | 758 h | 1000 h |
| 0.005 wt % | R1 | R3 | R3 | | R0 | R0 | R2 | |
| 0.010 wt % | R1 | R2 | R3 | | R0 | R0 | R2 | |
| 0.020 wt % | R1 | R3 | R3 | | R0 | R0 | R1 | |
| 0.100 wt % | R1 | R2 | R2 | | R0 | R0 | R2 | |

Whatever the polymer concentration, rusting appears faster with the comparative example than with the polymer of the invention.

Blistering Results assessed according to ISO 4628-2

|  | Polymer | | | | | | | |
|---|---|---|---|---|---|---|---|---|
|  | ACUMER ™ 1510 Comparative | | | | P1 | | | |
| Exposure time | 308 h | 564 h | 758 h | 1000 h | 308 h | 564 h | 758 h | 1000 h |
| 0.005 wt % | 1S1 | 1S1 | 1S1 | 5S1 | 0 | 0 | 0 | 2S1 |
|  |  |  | 2S1 | 4S1 |  |  | 0 | 1S1 |
|  |  |  | 2S1 | 4S1 |  |  | 0 | 1S1 |
| 0.010 wt % | 1S1 | 1S1 | 2S1 | 3S1 | 0 | 5 little | 0 | 2S1 |
|  |  |  | 2S1 | 2S1 |  | blisters | 1S1 | 1S1 |
|  |  |  | 2S1 | 2S1 |  |  | 1S1 | 1S1 |
| 0.020 wt % | 1S1 | 2S1 | 3S1 | 4S1 | 0 | 0 | 0 | 1 little |
|  |  |  | 3S1 | 3S1 |  |  | 0 | blister |
|  |  |  | 3S1 | 3S1 |  |  | 0 | 1S1 |
|  |  |  |  |  |  |  |  | 0 |
| 0.100 wt % | 0 | 1 little | 2S1 | 2S1 | 0 | 0 | 0 | 0 |
|  |  | blister | 2S1 | 2S1 |  |  | 0 | 0 |
|  |  |  | 2S1 | 2S1 |  |  | 0 | 0 |

Here again, the polymer of the invention is clearly better than the comparative, even after 1000 h.

The invention claimed is:

1. A polymer P obtained by radical copolymerization of a mixture of:
   acrylic acid;
   methacrylic acid; and
   at least one allylcatechol selected from the group consisting of 4-allylbenzene-1,2-diol; 3-allylbezene-1,2-diol, having the formulae below, and mixtures thereof

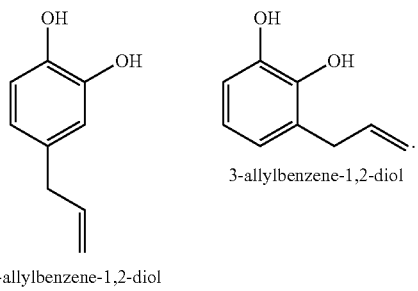

4-allylbenzene-1,2-diol 3-allylbenzene-1,2-diol

2. The polymer P of claim 1, wherein the at least one allylcatechol is a mixture of 4-allylbenzene-1,2-diol and 3-allylbenzene-1,2-diol.

3. The polymer P of claim 1, wherein the polymer has a molecular weight between 10 and 150 kDa.

4. The polymer P of claim 1, wherein the polymer contains acrylic acid (AA) at a content of 10 to 90% in mol; methacrylic acid (MAA) at a content of 1 to 70% in mol, and allylcatechol at a content of 1 to 20% in mol, each of the molar ratio being calculated on the basis of the total quantity of AA, MAA and allylcatechol.

5. A method, comprising treating a metallic surface intended to be coated by a paint, a varnish or an adhesive with at least one polymer P as defined in claim 1.

6. The method of claim 5, wherein the metal surface is a surface comprising a metal selected from the group consisting of aluminum, steel, zinc, magnesium and their alloys.

7. The method of claim 5, wherein a conversion composition a is applied on the metallic surface for forming a conversion coating thereon, and wherein:
   said conversion composition include all or part of the polymer P as an additive; and/or
   the conversion coating is applied on the metallic surface, and then all or part of the polymer P is applied on the conversion coating.

8. The method according to claim 5, wherein all or part of the polymer P is present in a paint, a varnish or a coating applied on the surface.

9. A process for coating a metallic surface with a paint, a varnish or an adhesive, comprising a step of treating said surface with at least one composition including at least one polymer P as defined in claim 1.

10. The process of claim 9, wherein the process is for coating a metallic surface with a paint.

11. The process of claim 9, wherein the composition comprising the polymer P is:
   a conversion composition including a polymer P; and/or
   a solution or a dispersion of the polymer P; and/or
   the paint, varnish or adhesive, that comprise a polymer P.

12. A conversion composition comprising at least one polymer P as defined in claim 1.

13. A paint, varnish or adhesive composition containing at least one polymer P as defined in claim 1.

14. A material comprising a metal surface which is in all or part (i) treated with at least one polymer P as defined in claim 1 and (ii) covered by a paint, a varnish or an adhesive.

15. The polymer P of claim 2, wherein the mixture has a molar ratio of 4-allylbenzene-1,2-diol to 3-allylbezene-1,2-diol between 30/70 and 70/30.

16. The method of claim 6, wherein the metal surface is a surface of aluminum or aluminum alloy.

17. The method according to claim 8, wherein all or part of the polymer P is present in a paint, a varnish or a coating applied on the surface after application of a conversion coating on the metal surface.

18. The process of claim 11, wherein the composition comprising the polymer P is a solution or a dispersion of the polymer P applied on the surface after having applied a conversion coating on the surface to be treated.

19. The material of claim 14, wherein said material is a material having a metal surface in all or part covered by:
   at least one coating comprising the at least one polymer P; and/or a layer comprising a reaction product of the at least one polymer P with a metal of the treated surface or another compound present in the layer.

\* \* \* \* \*